Feb. 20, 1968 H. ABERMETH 3,369,739
ROTARY PISTON INTERNAL COMBUSTION ENGINE, ESPECIALLY
CIRCULAR PISTON INTERNAL COMBUSTION ENGINE
Filed April 27, 1967 3 Sheets-Sheet 1

United States Patent Office 3,369,739

Patented Feb. 20, 1968

3,369,739

ROTARY PISTON INTERNAL COMBUSTION ENGINE, ESPECIALLY CIRCULAR PISTON INTERNAL COMBUSTION ENGINE

Hubert Abermeth, Cologne, Germany, assignor to Klockner - Humboldt - Deutz Aktiengesellschaft, Cologne-Deutz, Germany Filed Apr. 27, 1967, Ser. No. 634,343
Claims priority, application Germany, Apr. 30, 1966, K 59,132
5 Claims. (Cl. 230—145)

ABSTRACT OF THE DISCLOSURE

The present invention relates to a rotary piston internal combustion engine, especially circular piston internal combustion engine, with the outer profile of said piston determined by a trochoid and the inner profile of the surrounding housing portion following the enveloping curve of the trochoid, the said engine is according to the present invention characterized primarily in that the sealing strip means which are carried by the lobe portions of the inner housing profile extend into grooves in the housing side walls which latter have arranged therein sealing bodies facing the respective adjacent end wall of said piston and elastically pressed against both the respective adjacent piston end wall and the respective adjacent sealing strip means.

The present invention relates to a rotary piston internal combustion engine, especially circular piston internal engine in which the piston profile is determined by a trochoid, especially epitrochoid, while accordingly the housing profile follows the outer enveloping curve of the trochoid, the inner wall surface of said housing having its lobe sections provided with radial sealing means guided by inserts in the inner wall surfaces of said lobe sections.

It is an object of the present invention to provide a simple connection of the radial sealing means with the end face sealing means.

It is another object of this invention to provide an arrangement as set forth in the preceding paragraph which will be reliable and safe in operation.

These and other objects and advantages of the invention will appear more clearly from the following specification in connection with the accompanying drawings, in which:

FIGURE 1 is a partial longitudinal section through a circular piston internal combustion engine with meshing engagement.

FIGURE 1*a* is a section along the line **1*a*—1*a*** of FIGURE 1.

Figure 4:
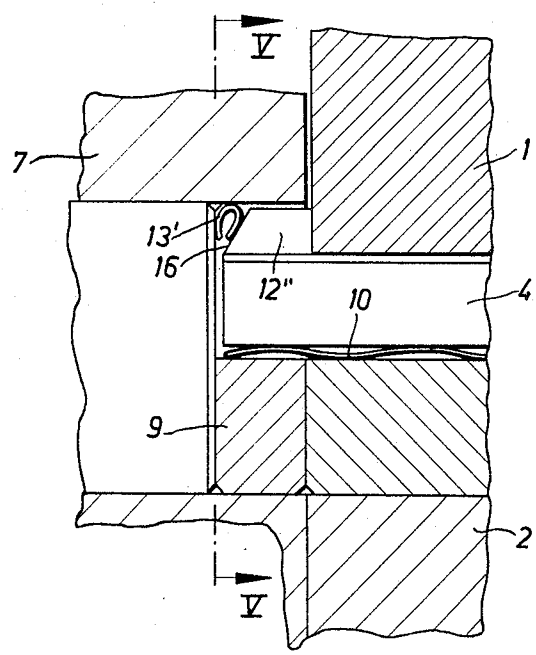
Figure 5:
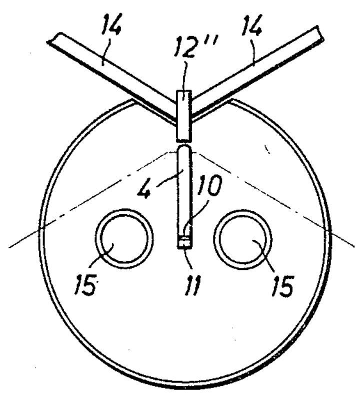
Figure 6:
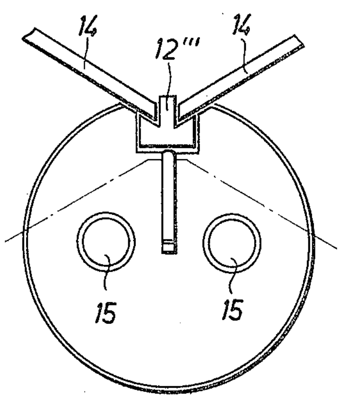

FIGURES 4 to 6 respectively illustrate a further embodiment of the invention, with FIG. 5 representing a section along the line V—V of FIG. 4.

The rotary piston internal combustion engine according to the present invention is characterized primarily in that the sealing strips extend into grooves of the side walls of the engine in which on that side of the sealing strips which faces the piston there are provided sealing bodies which by an elastic means are pressed against the respective adjacent end face of the piston and the sealing strip and are designed as connecting members between the sealing strips and sealing straps.

According to a further development of the present invention, the side walls of the engine are within the range of the sealing body and the insert for the sealing strips provided with a recess in which is inserted a body having the necessary fits for the sealing strips, the sealing body and the end face seals. According to the invention, there exists the advantageous possibility of designing the insert for guiding the sealing strips as one piece with the guiding body in the side walls. When the side walls are provided with openings adapted to be closed in the direction of the radial seals, it is easily possible to remove the connecting members between the radial seals and the end face seals as well as the radial seals themselves without having to disassemble the engine.

Figure 1:
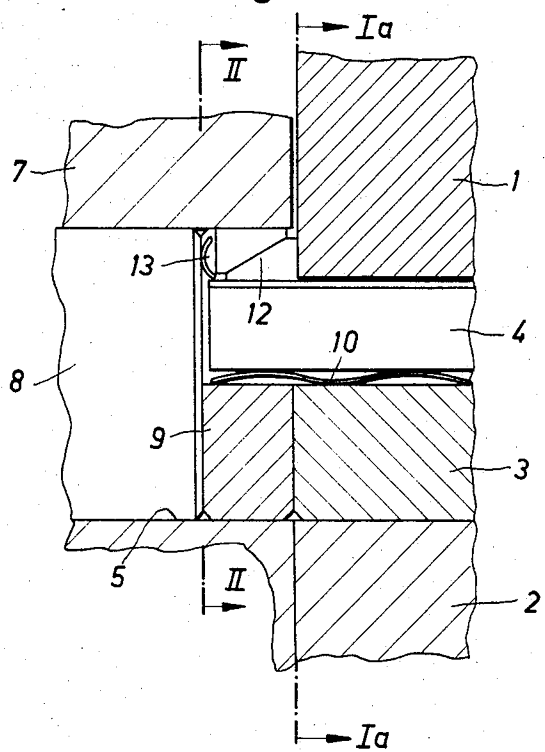

Referring now to the drawing in detail, FIG 1 shows a portion of a circular piston internal combustion engine with a piston 1, the profile of which is determined by an epitrochoid. Accordingly, the profile of the housing 2 follows the outer enveloping curve of the epitrochoid. The lobe areas (indicated by dot-dash lines in FIGS. 2 and 3) of the inner wall surface of housing 2 are provided with special inserts 3 for guiding the sealing strips 4 as disclosed e.g. in assignee's copending application to Keylwert Ser. No. 634,342, filed of even date herewith. The inserts 3 and the sealing strips 4 may be inserted into the engine through a bore 5 in the housing side wall 7, said bore 5 being closed by a closure member 8. An extension of the insert 3 or a special disc 9 extends into the bore 5. The sealing strip 4 is by means of an undulated spring 10 pressed radially against the piston 1. The said strip 4 extends beyond the width of the piston and is guided in a groove 11 of disc 9. In radial direction, the sealing strip 4 within the range of disc 9 is followed by a two-part sealing body 12. The parts of the sealing body 12 act in the manner of wedges and are by means of a spring element 13 respectively pressed against the housing side wall 7 and the end face of the piston 1 and the sealing strip 4. The sealing bodies 12 are followed by the sealing members 14 of the end face seals.

Figure 3:
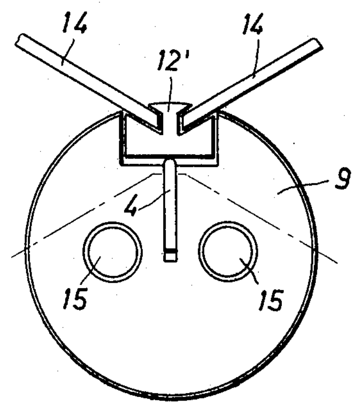
FIGURE 3 is a section similar to that of FIG. 2, but slightly modified thereover.
Figure 1A:
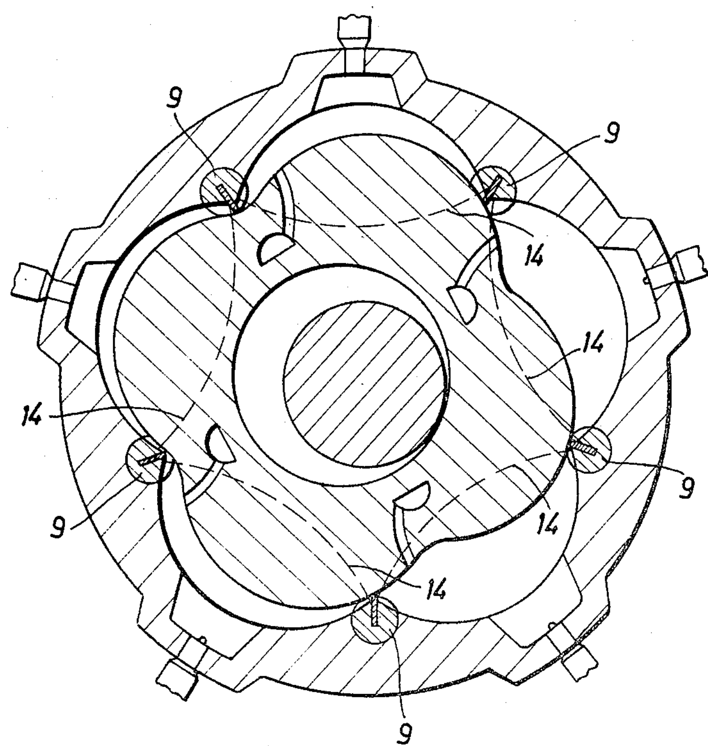

The thickness of the sealing bodies 12 may equal or exceed that of the sealing strip 4. If the sealing piece 12′ is thicker than the sealing strip 4, it is advantageous, for improving the sealing effect, that the sealing members 14 extend into the sealing piece 12′ (FIG. 3). For purposes of cooling and/or lubricating the sealing strips 4, the inserts 3 are at both sides of the sealing strip 4 provided with bores 15.

Figure 2:
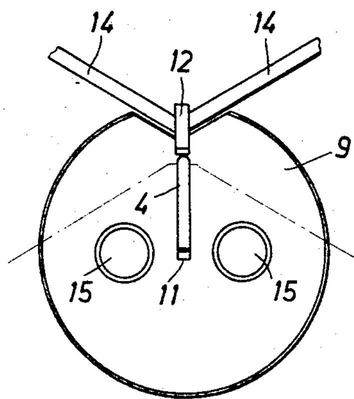
FIGURE 2 illustrates on an enlarged scale a section along the line II—II of FIG. 1 and shows details of an insert for guiding sealing strips.

The arrangements of FIGS. 4 to 6 differ from those of FIGS. 1 to 3 primarily in that the sealing body 12″ is designed as a single piece and through the intervention of a spring element 13′ acting upon the inclined surface 16 of the sealing body 12″, is pressed against the end face of the piston 1 and against the sealing strip 4.

FIGS. 5 and 6 respectively show different embodiments of the sealing bodies 12″, 12‴ of the invention, similarly to FIGS. 3 and 4 respectively.

It is, of course, to be understood that the present invention is, by no means, limited to the particular constructions shown in the drawings, but also comprises any modifications within the scope of the appended claims.

What I claim is:

1. A rotary piston internal combustion engine, especially circular piston internal combustion engine, which comprises: a piston having an outer profile determined by a trochoid, a housing having its inner profile surrounding said piston and following the contour of the outer enveloping curve for said trochoid so as to form lobe portions, insert means respectively arranged in said lobe portions and respectively provided with groove means extending in the axial direction of said piston and being open toward said piston, sealing strip means respectively inserted in said groove means and sealingly engaging the periphery of said piston, said housing also having side walls respectively facing the end faces of said piston and being provided with passage means forming an extension of said groove means for receiving a portion of said sealing strip means, that side of said side walls which faces the respective adjacent end face of said piston being provided with chamber means, sealing body means located in said chamber means, elastic spring means pressing said sealing body means against both the respective adjacent end face of said piston and said sealing strip means, and sealing members supported by said sealing body means and sealingly engaging the respective adjacent end face of said piston.

2. An engine according to claim 1, in which said sealing body means exceed said sealing strip means in width and are provided with lateral recesses for receiving said sealing members.

3. An engine according to claim 1, in which said chamber means includes a recess within the area of said sealing body means and said insert means for said sealing strip means, and in which disc means are inserted in said recess means, said disc means being provided with means for receiving said sealing strip means and said sealing body means and said sealing members.

4. An engine according to claim 3, in which each of said insert means having said sealing strip means inserted therein together with the respective adjacent disc means in the respective adjacent side wall forms a single integral piece.

5. An engine according to claim 1, in which said side walls are provided with openings arranged within the area of said insert means and etxending all the way through said side walls for removing therethrough said insert means, and detachable closure means normally closing said openings.

References Cited

UNITED STATES PATENTS

| | | | |
|---|---|---|---|
| 3,175,503 | 3/1965 | Peras | 123—8 |
| 3,176,909 | 4/1965 | Maurhoff | 230—145 |
| 3,185,386 | 5/1965 | Peras | 230—145 |
| 3,193,186 | 7/1965 | Peras | 230—145 |
| 3,226,013 | 12/1965 | Toyoda et al. | 230—145 |

DONLEY J. STOCKING, *Primary Examiner.*

WILBUR J. GOODLIN, *Examiner.*